Jan. 7, 1964　　　O. KLOSTER ETAL　　　3,116,512
FISH FILLETING MACHINES

Filed April 22, 1960　　　　　　　　　4 Sheets-Sheet 1

INVENTORS
Ole Kloster
BY Paul Kloster
Albert Jacobs
Attorney

Jan. 7, 1964   O. KLOSTER ETAL   3,116,512
FISH FILLETING MACHINES

Filed April 22, 1960   4 Sheets-Sheet 3

INVENTORS
Ole Kloster
Paul Kloster
BY
Attorney

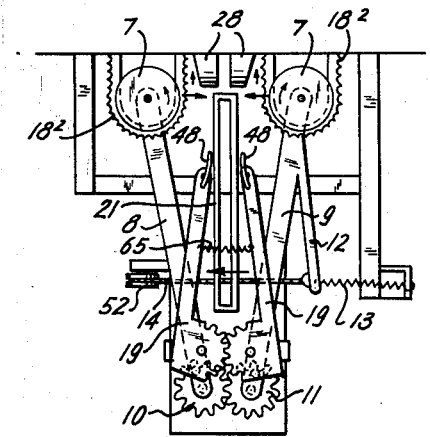
FIG. 8
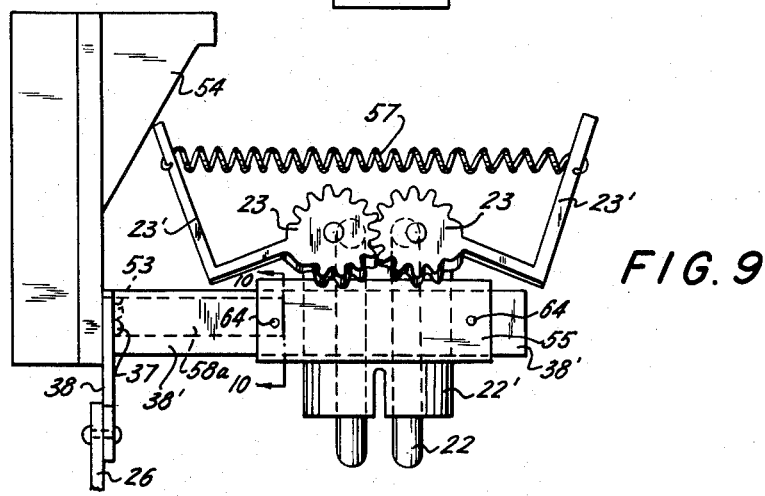
FIG. 9
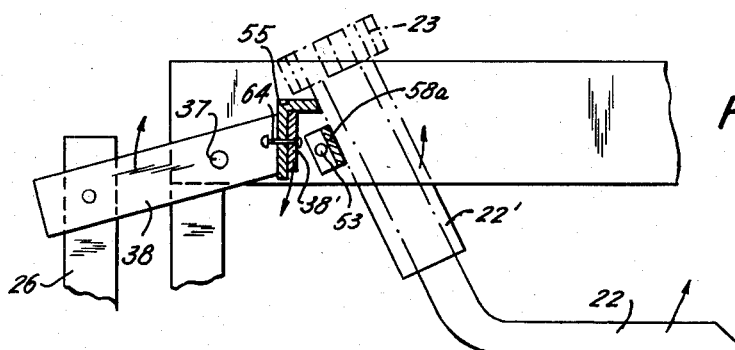
FIG. 10
FIG. 11
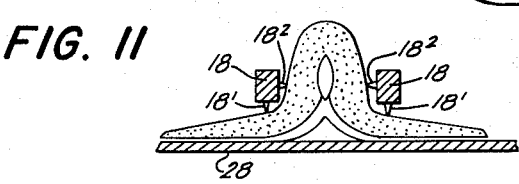

United States Patent Office 3,116,512
Patented Jan. 7, 1964

3,116,512
FISH FILLETING MACHINES
Ole Kloster and Paul Kloster, both of 4 Emmausveien,
Stavanger, Norway
Filed Apr. 22, 1960, Ser. No. 24,070
5 Claims. (Cl. 17—4)

This invention is concerned with fish filleting machines and more particularly to a machine of the kind provided with rotary backbone knives and rotary, horizontally disposed sidebone knives, and wherein the fish, after its head has been removed and it has been gutted, is fed by means of two endless chain conveyors against the said knives, with its headpart in the direction of feed lying on its gutted underside.

It is the general object of the invention to provide an improved fish filleting of the kind described, capable of filleting fish of various size and kind, without readjustment of the machine.

Another object of the invention is to provide a machine for filleting fish, capable of filleting fish, without separating sidebones from the backbone thereof, so that the fish fillets, when leaving the machine are entirely free of any bone, so that no bone has to be removed from the fillets after the fish has left the machine.

The fish filleting machine of the kind described is characterised by the provision of a lower pair of backbone knives mounted on a frame which is movable up and down in the vertical plane. This vertical movement of the frame is effected as follows: after the headpart of the fish with its sidebones still attached passes by the lower pair of backbone knives the fish actuates a primary feeler which releases the frame from a down, or fish receiving position, so that the frame moves upward. The backbone knives, below the fish, then cut loose the backbone of the fish's tailpart and the upper pair of backbone knives cuts the backbone loose along the entire length of the fish. At the same time, the sidebone knives cut loose the sidebones, without separating the bones from the backbone.

The machine according to the invention is further characterised by the provision of a feeler arm, which is moved by the boneless fish fillet before leaving the machine, to effect, through mechanical means, the downward movement of the frame into a locked inoperative position whereupon a new fish releases the frame for a upward movement into its working position.

Other objects and characteristics of the fish filleting machine according to the invention will appear from the following description and accompanying drawings of a preferred embodiment of the invention.

In the drawings:

FIGURE 8 is a top view of the front portion of the machine.

FIGURE 9 is an enlarged end view of members 22 in their inoperative position.

FIGURE 10 is a side view of FIGURE 9, with members 22 shown in their operative position.

FIGURE 11 is a fragmentary sectional view of a detail showing pins $18^1$ and $18^2$ in coordination with conveyors 18.

The fish filleting machine is driven by an electric motor 45, by means of chains, chain wheels and pinions, shown diagrammatically and in accordance with accepted practice.

Figure 1:
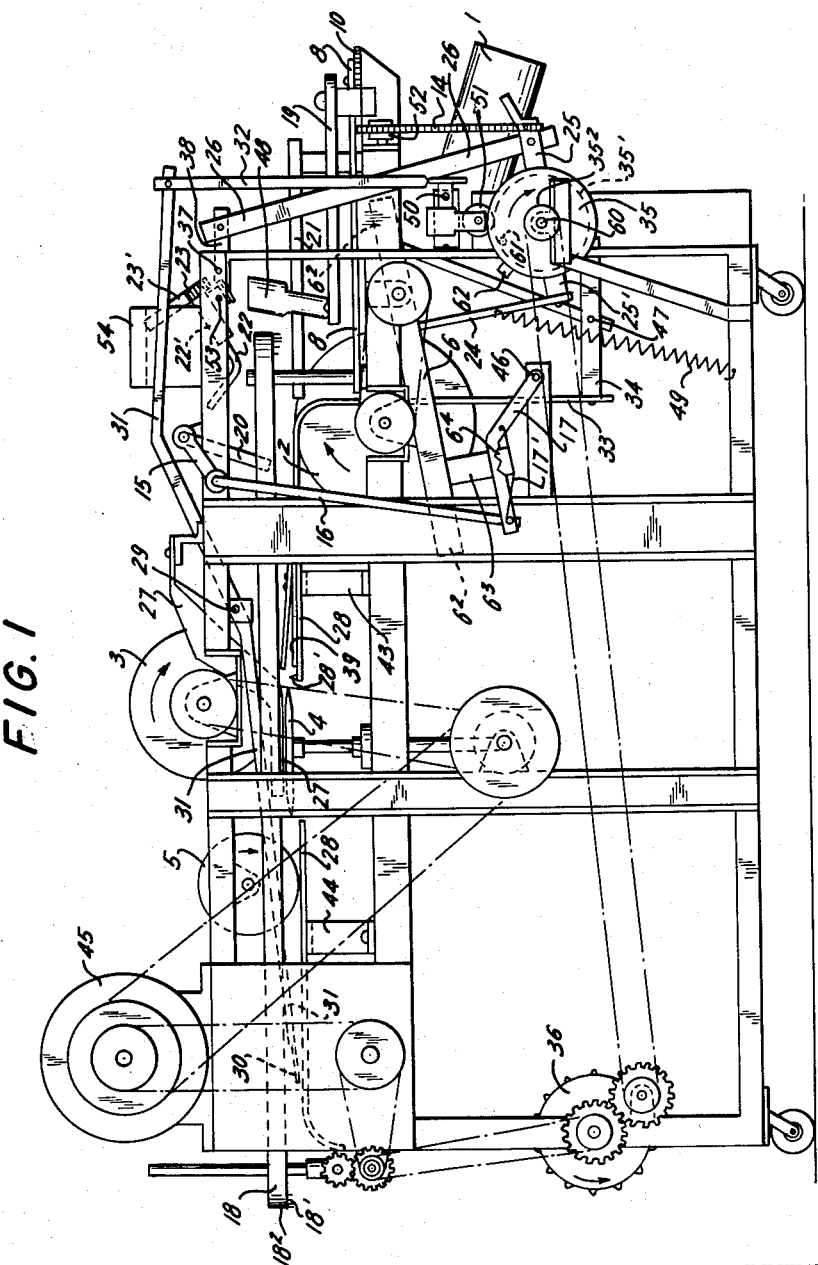
FIGURE 1 shows in elevation one side of the machine with the lower pair of backbone knives shown in their lower, out of use position.
Figure 2:
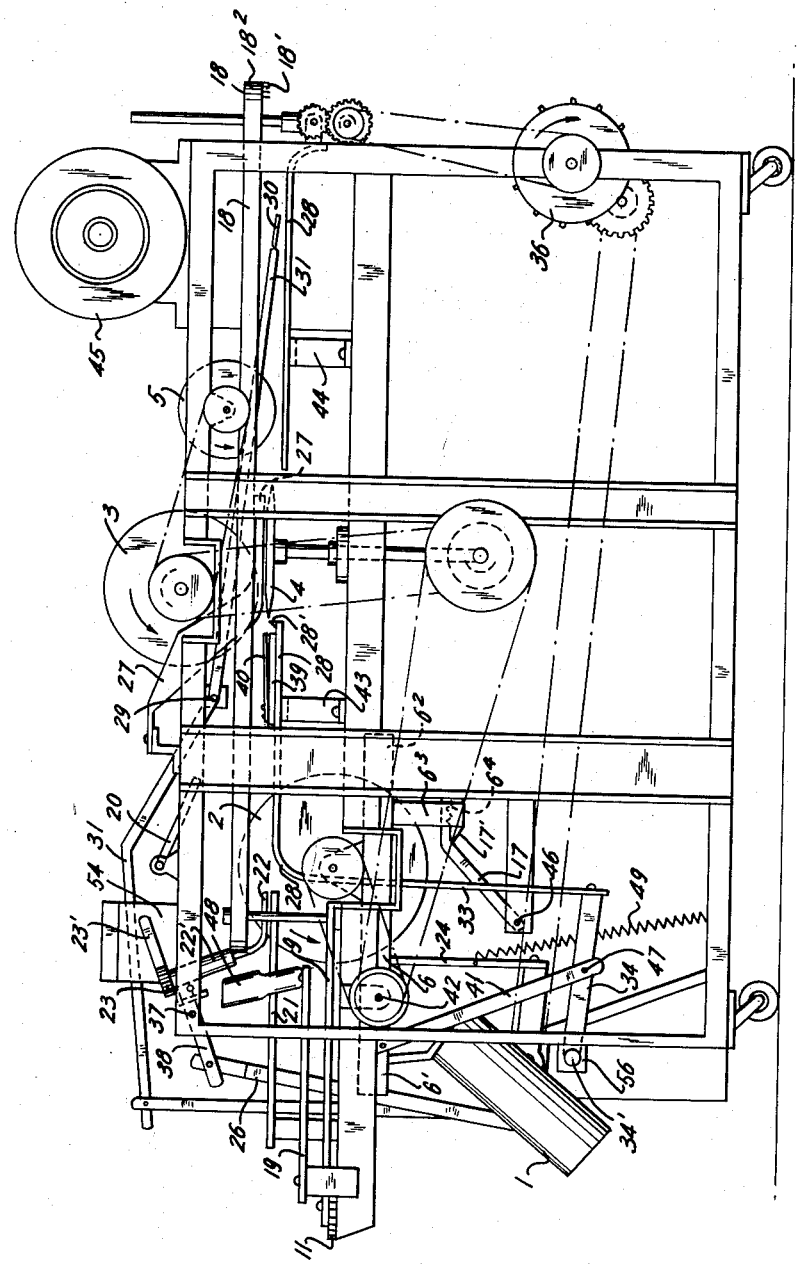
FIGURE 2 is a similar view, seen from the opposite side of FIGURE 1, with the lower pair of backbone knives shown in their upper, working position.
Figure 6:
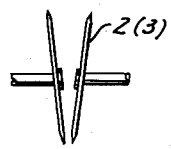
FIGURE 6 is a top view of the backbone knives. Since both the under and upper backbone knives are arranged in the same manner, the numerals 2(3) are used to convey this fact.
Figure 7:
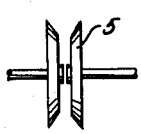
FIGURE 7 is a top view of the extra pair of knives. The knives appear smaller when seen in the front and rear.

The machine is provided wtih a lower pair of rotary backbone knives 2, preferably inclined one to the other, so that they form a V as shown in FIGURE 6. The knives 2 are mounted near the machine's feeding end (right side in FIGURE 1) on a frame $6^1$, 6, $6^2$, movable in a vertical plane about a horizontal axle 42. The frame's front end $6^1$ is provided with a weight 1, which tends to turn the frame's rear end $6^2$ upwards and thereby bring the lower backbone knives 2 into their working position (FIGURE 2). Behind the knives 2 is arranged an upper pair of rotary backbone knives 3 and below the knives 3 are arranged two rotary horizontally disposed sidebone knives 4, which will cut loose the sidebones in the fish lips or flanks, while they are outspread on a resilient plate 28 provided with a longitudinal, central opening (see FIGURE 8 which shows the feeding end of the machine in plan, parts of the machine being omitted for clearness). The upper pair of backbone knives 3 cut loose the backbone along the entire length of the fish at the same time as the sidebone knives cut loose the sidebones, without separating them from the backbone. The knives 3 are preferably arranged at an inclination one to the other as shown in FIGURE 6 with respect to the knives 2. Behind the knives 3 is arranged an additional pair of knives 5 (see FIGURE 7) parallel with each other, which are placed closer to the plate 28 than the knives 3. Said knives 5 cut away any remaining connection between the fish fillets and the backbone.

The fish is fed against the different knives 2, 3, 4 and 5, while lying between two endless conveyor chains 18, running around horizontal chain wheels, of which the two nearest the machine's feeding and are supported on two rods 8, 9, which are turnable in a horizontal plane and are eccentrically fixed on two meshing gear wheels 10, 11 respectively, so that the two rods 8, 9 will make the same turn inwards or outwards when one is effected. Rod 9 has an arm 12, whose free end is connected with a spring 13, which tends to pull the chain wheels 7 outwards in relation to each other. A chain 14, running over a chain wheel 52 is as described later drawn downwards (see FIGURES 2 and 3) at the moment the frame 6 is moved upwards into its working position (FIGURE 2) and as a result forces the chain wheels 7 and 8 towards each other, whereby the feed conveyor chains 18, at the feeding end of the machine will be pressed against the sides of the fish's thinner tailpart and thereby obtain better conveyance of the fish. The feed conveyors 18 are, on their gripping faces, provided with horizontally placed pins $18^2$ (see FIGURE 8) which grip the sides of the fish. The conveyors 18 are also provided with down-pointing pins $18^1$ which, from above, grip the outspread fish lips or flanks and together with the first mentioned pins $18^2$ aid the passage of the fish through the machine. The conveyor pins $18^1$ and $18^2$ are especially useful when feeding a large and heavy fish through the machine. In FIGURES 1 and 2, the pins $18^1$, $18^2$ are, for clarity, only shown at the ends of the conveyor 18.

The fish, the head of which has been removed and also gutted, is fed towards the knives 2, with its headpart in the feeding direction and lying on its gutted underside on a horizontal bar 21 and is centered relative the knives by means of two spoon-shaped devices 48, each carried by the rear end of an arm 19, which at their front ends are each provided with a meshing segmental gear wheel pressed together by means of a spring 65. The spoon devices 48 adjust themselves resiliently according to the broadness of the fish and ensure that the fish is fed centrally in the machine. From the bar 21 the fish is fed over on a resiliently mounted plate 28 provided with a longitudinal, central opening or slot, in which the ventral fin of the fish is located. After the fish's headpart, in which the sidebones are located, has passed the lower pair of the backbone knives 2, the forward part of the fish strikes against a feeler 20, movable in a vertical plane, and causes the feeler to turn upwards (see FIGURE 2). An arm 15, connected at one end with the feeler, and whose other end is articulated to a rod 16, will thereby be turned up to pull up the rod 16, the lower end of which is articulated to a lever arm 17, which holds the frame 6 in its lower, out of use position (FIGURES 1 and 2), the frame being provided with a dependent angular arm 6³ with teeth 6⁴, which mesh with similar teeth on the arm 17. A tension spring 49, fixed to the machine frame at one end has its other end fastened to a rod 24, articulated to the rear end 6² of the frame 6, assists to keep the frame in its out of use position (FIGURE 1). As the rod 16 is pulled up, the arm 17 will be lifted and disengage its teeth with those on the arm 6³ of the frame. The frame 6 is thereby released and the weight 1 causes its rear end 62 to move upwards until the frame comes to rest in its upper and approximately horizontal position, in which the knives 2 are in their operative working position (FIGURE 2).

The resilient plate 28, on which the fish is fed against the various knives ends up just in front of the sidebone knives 4 and is continued on the opposite side thereof. The frontpart of the plate 28 extends downwards as at 33 and connected to an angular rod 34, 34¹, the arm 34¹ being mounted in a bearing 56 and thus the rod 34 is movable in a vertical plane. The bearing 56 is provided in the machine frame. The angular rod 34, 34¹ is, by means of a pivot pin 47, articulated to an upwardly directed rod 41, which at its upper end is pivoted to the front part of frame 6 (see FIGURE 2). As the frame 6 is moved into its working position, its front part will move downwards and thereby pull down the rod 41, whereby the rear end of rod 34 connected to the part 33 of the plate 28 is moved downward, resulting in the front end of the plate 28 being brought lower than at the start of the filleting action, and thinner tailpart of the fish will be lowered relatively to the filleting knives 2, whereby a better cutting of the tailpart of the fish is achieved.

A two-armed lever rod 25, 25¹ is rockable in a vertical plane on a stationary axle 60, its rear end 25¹ being pivoted to the rear end 62 of the frame 6 by means of the rod 24. Thus, when the frame 6 is turned into its working position (FIGURE 2), the other arm 25 will be turned down and pull down the chain 14 so that as already described, the chain wheels 7 will be caused to move towards each other, and the feed conveyors 18 will be pressed close against the sides of the tailpart of a fish, whereby the already mentioned advantages according to the fish's feeding are achieved.

Arranged above the knives 2 are two pressure members 22, fixed eccentrically to each of two meshing tooth wheels 23 and mounted in bearing in a housing 22¹, movable in a vertical plane by means of an angular member 58, fixed to said housings 22¹ and mounted on the machine frame by means of a pivot bolt 53 (see FIGURES 9 and 10). As the members 22 at their upper ends are fixed eccentrically to the meshing gear wheels 23, turning the wheels 23 will cause the members 22 to move towards or apart from one another. Each of the gear wheels 23 carries an angular arm 23¹, between which a spring 57 is arranged, to force free ends of the arms 23 apart. An inclined plate 54 prevents the free ends of the arm from complete outward movement, as the free end of one arm 23¹ rides on the plate 54. When said free end of the one arm 23¹ moves downwards (see FIGURE 9) the arms 23¹ move outwards relatively to each other, said movement being in accordance with the inclination of plate 54. The members 22 will thus move closer towards each other; this movement takes place while the tailpart of the fish is being cut by means of the knives 2, in the following manner. An angle member 55 is fastened to the housing 22¹ and by means of a pin 64 is pivoted to the rear end 38¹ of an angled lever arm 38, 38¹, movable in a vertical plane on a pivot pin 37. The front end of the lever arm 38 being articulated to the front end of the lever arm 25 by means of a rod 26, so when the arm 25 moves downwards (by the movement of the frame 6 into its working position), the angular part 38¹ of the lever arm 38 will be forced upwards (see FIGURE 10) and thereby cause the members 22 to turn downwards, whereby they will move towards each other as already described. The members 22 will heel over against the thinner tailpart of the fish and press said part against the knives 2, whereby perfect cutting is achieved.

After the fish's tailpart has been cut from below along each side of the backbone, the fish is fed against the upper pair of backbone knives 3 and the horizontal sidebone knives 4. In front of knives 3, 4 the resilient plate 28 is provided with two other spring plates 39, 40 each with a longitudinal slot corresponding to that in plate 28. Plate 28 has also a transverse bead 28¹, which together with said plates 39, 40 help to lift the thin fishtail up against the knives 3, whereby better cutting is achieved. The pair of upper, rotary backbone knives 3 cut loose the backbone along the entire length of the fish at the same time as the sidebone knives 4 cut loose the sidebones in the outspread fish lips or flanks. Spring presser plates 27, of which one end is fixed to the machine frame, press with their free ends, the fish lips down against the knives 4. As already described, an extra pair of vertically arranged knives 5 is arranged behind knives 3, 4 in order to cut away any remaining connection between the fillet and the backbone.

Figure 3:
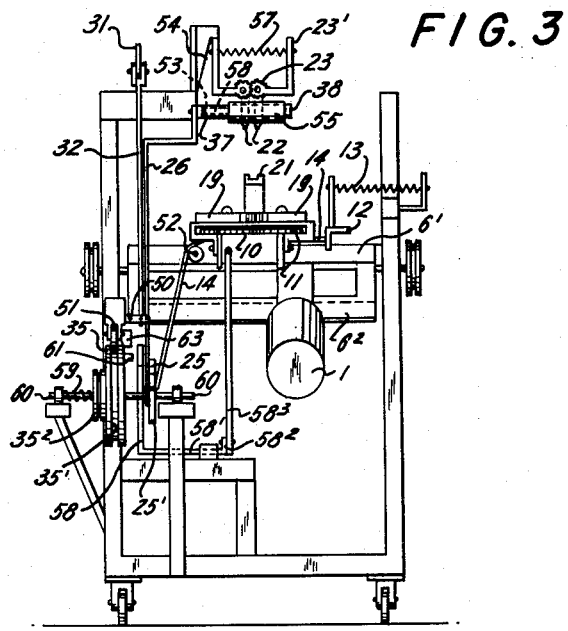
FIGURE 3 shows the machine from the feeding end, right side in FIGURE 1, left side in FIGURE 2—with the frame in the same position as in FIGURE 1, parts of the machine being omitted for clearness.
Figure 5:
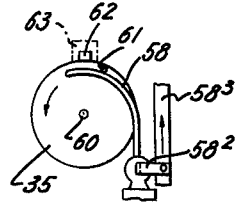
FIGURE 5 is a right side view of FIGURE 4.

The two boneless fish fillets are now led out of the machine, lying on the elastic plate 28; the right hand fillet passes between the plate 28 and the free, rear end 30 of a lever rod 31, movable in the vertical plane on a pivot pin 29. The fish fillet lifts the free, rear end 30 upwards during its passage between said end 30 and the plate 28, so that the front end, i.e. feed end of the machine, will be forced down and by means of a rod 32 cause the downward movement of the frame 6 into locked, out of use position, the machine being brought to the starting position again, ready for another fish to be fed into the machine. The action is as follows:

On the fixed axle 60 there is displaceably mounted a coupling wheel 35, driven in the direction of the arrow (FIGURES 1 and 5) by means of a chain through the intermediary of a chain wheel 35², fixed to the coupling wheel 35. Behind the coupling wheel 35 (according to FIGURE 1—at the right side according to FIGURE 3) is arranged a vertically movable arm 58, which is shaped in a curve corresponding to the direction of rotation of the coupling wheel 35. The lower end of the curved arm 58 carries an angled horizontal arm 58¹, which has a bearing in the machine frame, and which, on the opposite side of said bearing is provided with second angled arm 58², directed toward the feeding direction of the machine. The free end of arm 58² is connected with an upwardly directed rod 58³, whose upper end is articulated to the front end 6¹ of the frame 6 (see FIGURE 3). As the curved arm 58 is forced downwards (in the direction of arrow FIGURE 5) by a stud 61, fixed to the rear side of the coupling wheel (according to FIGURE 1—right side according to FIGURE 3), the rod 58$^3$ will be forced upwards and thereby pull up the front end 6$^1$ of the frame 6, and the read end 6$^2$ thereof, with the knives 2 downwards, so that the frame 6 is again brought to its lower, out of use and locked position (FIGURES 1 and 3). As already described, the coupling wheel 35 is displaceable on the stationary axle 60 and is pressed against the arm 58 by means of a spring 59. A caster 51 rotatable on a lever arm, movable in the vertical plane about a pivot pin 50, which extends through the front end of the lever arm and a shank fixed to the machine frame. The caster 51 runs, during the whole cutting process of the fish, in a peripheral slot 35$^1$ formed in the coupling wheel 35, and thereby keeps the stud 61 clear of the curved arm 58 (see FIGURE 3) against the pressure of the spring 59.

Figure 4:
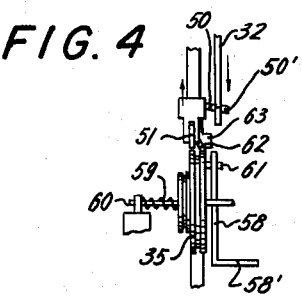
FIGURE 4 is an enlarged front view of a portion of FIGURE 3.

As the fish fillet, as already described, lifts the free rear end 30 of the lever arm 31, due to its passage between the said end and the plate 28, to force the pivot rod 32 downwards, the caster 51, whose lever arm is articulated to the lower end of rod 32, will be moved up (see FIGURE 4) and out of the peripheral slot 35$^1$ of the coupling wheel 35, whereupon the spring 59 will press the wheel 35 inwards (according to FIGURE 1), so that the stud 61 can actuate the curved arm 58, and as described, the frame 6 is moved to its lower out of use position (FIGURE 1) and locked. The caster 51, which during this operation runs on the left side (according to FIGURES 3 and 4) of the slot 35$^1$ of the coupling wheel 35 and is engaged with the slot 35$^1$ again during the following rotation of the wheel 35. This is achieved by means of a stationary abutment 63, with an inclination both in the vertical and horizontal plane and whose free end lays almost in the same vertical plane as the caster. Said stationary abutment 63 co-operates with another abutment 62, whose inclination is similar to 63 and which is fixed to the periphery, of wheel 35 so that when the abutments 62, 63 pass each other during the rotation of the wheel 35, the wheel is forced to the left (according to FIGURE 3). The caster 51 is thus caused to enter the slot again and pressed down therein, as the free rear end 30 of the lever arm 31 falls after the fish fillet has passed and thereby causes the rod 32 to move up and the lever arm of the caster 51 down. The machine is now brought to its starting position again ready to receive another fish.

What we claim and desire to secure by Letters Patent is:

1. A machine for cutting fillets from a previously beheaded and gutted fish, comprising in combination, elongated support means having a slot running lengthwise of the machine through a cutting station, means for conveying fish with their beheaded end foremost, along the length of the support means in registry with the slot, said conveying means comprising two endless conveyors having opposed lengths extending along opposite sides of the slot, guide wheels against which said conveyors run, said guide wheels being disposed in the length of the support means before the cutting station and being mounted for movement transversely of the slot towards and away from one another, and means for moving the guide wheels towards each other, a pair of co-acting rotary backbone knives, a carrier frame therefor, said carrier frame being disposed beneath the support means and mounted for movement between raised and lowered positions to carry the knives between operative and inoperative positions, the knives in their operative positions projecting through the slot so as to sever a fish conveyed thereover, means for moving the carrier frame between its two positions, means for detecting passage through the cutting station of the foremost portion of a fish the narrower tail portion of which is to be severed by the backbone knives, said detecting means being operative to actuate said carried frame moving means to move the carrier frame to its raised position so that the backbone knives sever the underside of the narrower tail portion of the fish from the backbone, and means, responsive to movement of the carrier frame towards its raised position, for actuating said guide-wheel-moving means to cause the two conveyors to grip firmly the narrower tail portion of the fish while it is severed by the backbone knives.

2. A machine for cutting fillets from a previously beheaded and gutted fish, comprising in combination, a frame, elongated support means mounted thereon and having a slot running lengthwise of the machine through two successive cutting stations, means for conveying fish, with their beheaded end foremost along the length of the support means in registry with the slot, a pair of upwardly directed rotary backbone knives, a carrier frame therefor, said carrier frame being disposed beneath the support means and mounted for movement between raised and lowered positions to carry the knives between operative and inoperative positions, the knives in their operative positions projecting through the slot so as to sever a fish conveyed thereover, means for moving the carrier frame between its two positions, and means for detecting passage through the first cutting station of the foremost portion of a fish the narrower tail portion of which is to be severed by the backbone knives, said detecting means being operative to actuate said carrier frame moving means to move the carrier frame to its raised position, a pair of downwardly directed rotary backbone knives disposed above the support means at the second cutting station to sever the back of the fish along the whole length thereof on opposite sides of the backbone as the fish is conveyed beneath the downwardly directed knives, and a pair of sidebone knives disposed at the second cutting station to sever the fish along the length thereof as it is conveyed through the second cutting station, the conveying means comprising two endless conveyors having opposed lengths extending along opposite sides of the slot and which further comprises guide wheels against which said conveyors run, said guide wheels being disposed in the length of the support means before the first cutting station and being mounted for movement transversely of the slot towards and away from one another, means for moving the guide wheels towards each other, and means responsive to movement of the carrier frame towards its raised position for actuating said guide-wheel-moving means to cause the two conveyors to grip firmly the narrower tail portion of the fish while it is severed by the upwardly directed backbone knives.

3. A machine according to claim 2, in which said support means in the region of the first cutting station are provided by a resilient plate mounted horizontally on the machine frame for flexure about a horizontal axis transverse to the length of the support means, and in which means, responsive to movement of the carrier frame towards its raised position, are provided for flexing said resilient plate downwardly about said axis so that the plate is flexed downwardly as the carrier frame is moved to its raised position.

4. A machine according to claim 3, further comprising second means, disposed in the length of the support means after the second cutting station, for detecting passage of a fish after it has emerged from the second cutting station, said second detecting means being operative to actuate said carrier frame moving means to move the carrier frame back to its lowered position.

5. A machine according to claim 4, in which each conveyor is provided with downwardly directed projections to engage outspread portions of the fish.

References Cited in the file of this patent

UNITED STATES PATENTS

| | | |
|---|---|---|
| 2,479,010 | Jones | Aug. 16, 1949 |
| 2,704,378 | Schlichting | Mar. 22, 1955 |
| 2,841,816 | Westerdahl | July 8, 1958 |